March 13, 1928.
J. M. ROOD ET AL
1,662,399
SANITARY MILK BOTTLE CONTAINER
Filed May 21, 1926
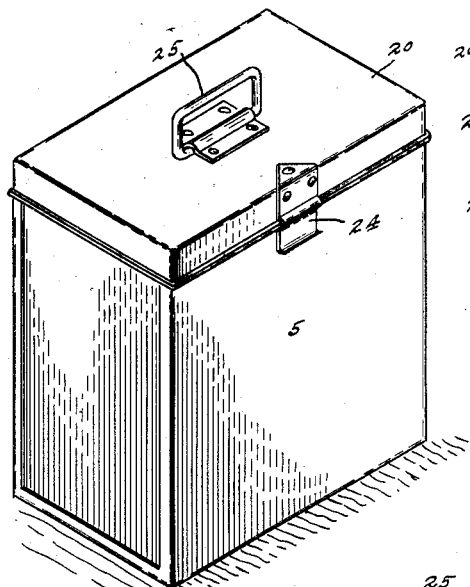
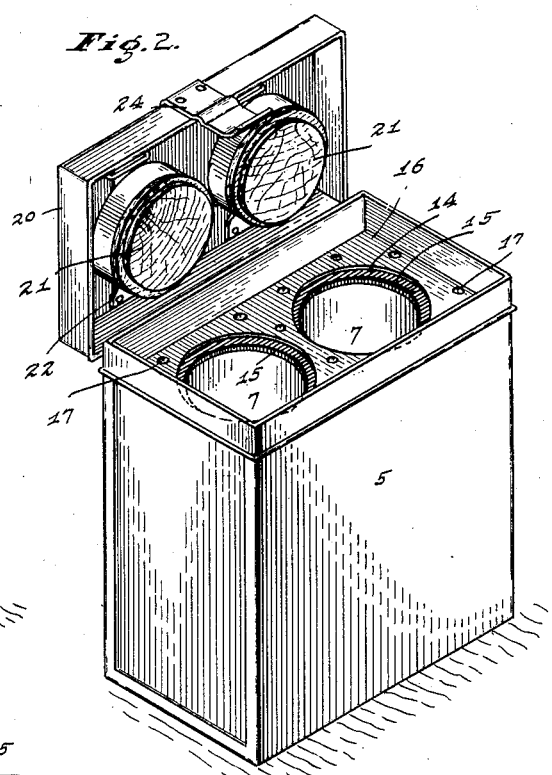
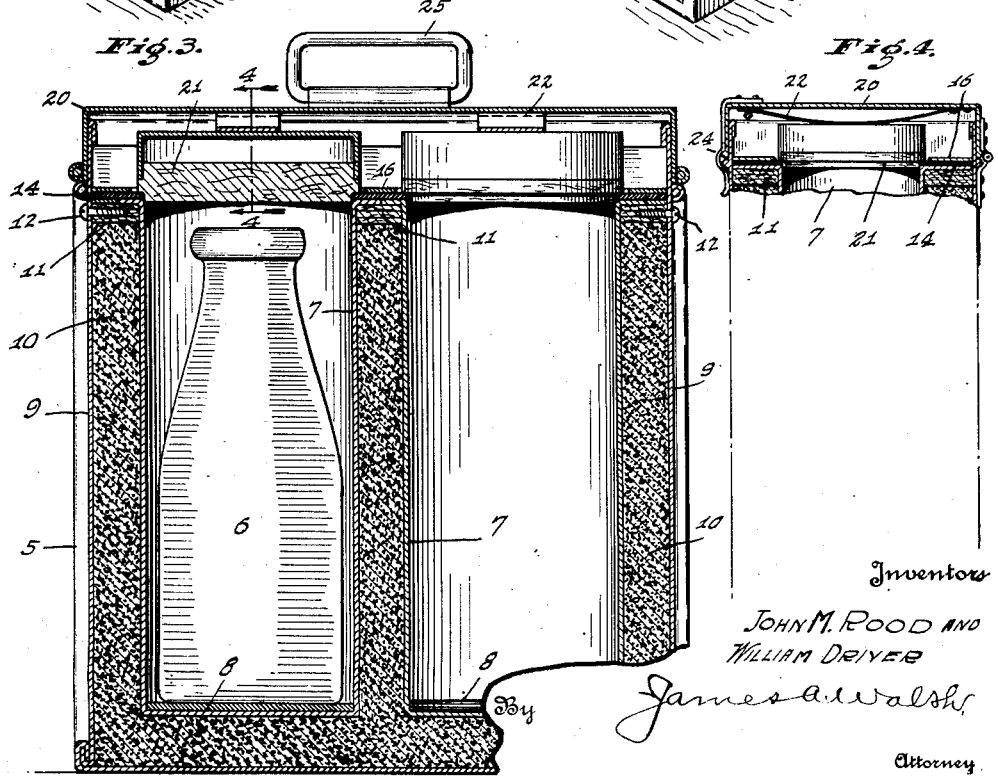
Inventors
JOHN M. ROOD AND
WILLIAM DRIVER
By James A. Walsh
Attorney Patented Mar. 13, 1928.

1,662,399

UNITED STATES PATENT OFFICE.

JOHN M. ROOD AND WILLIAM DRIVER, OF RACINE, WISCONSIN.

SANITARY MILK-BOTTLE CONTAINER.

Application filed May 21, 1926. Serial No. 110,612.

It is common practice to deliver milk from house to house in bottles temporarily sealed by paper caps, and such deliveries are usually made before the customers arise, so that the bottled milk is exposed to weather conditions a considerable length of time before taken indoors, and during which period the bottles are unprotected from the acts of animals and otherwise and subject to breakage and loss of milk by disturbance of the seals and other causes. It is the object of our invention to provide a sanitary container for milk bottles of such character that the bottles will not be exposed when properly deposited in the container, and by the use of which container milk will be protected from freezing in cold weather, and, also, will not be affected by climatic conditions in warm weather, as will hereinafter more fully appear.

In the accompanying drawing, forming part hereof, Figure 1 is a perspective of our improved container; Fig. 2 is also a perspective showing the container opened and ready for the insertion of milk bottles; Fig. 3 a transverse sectional view showing a bottle in one of the compartments; and Fig. 4 is a detail section taken on the dotted line 4—4 in Fig. 3.

In said drawing the portions marked 5 indicate the body of our improved container, which may be rectangular in form or any other desired shape, and also may be of different sizes to accommodate one or a number of bottles, 6, two of such compartments being shown. In arranging such compartments we preferably employ cylindrical receptacles, as 7, having shock-absorbing or other appropriate bottoms, 8, of rubber or other suitable material, and fill into the spaces between said receptacles and the walls 9 of the container with insulating material, such as ground cork 10, or other non-conducting material, as indicated in Fig. 3, and which material is retained by a non-shrinkable keeper, 11, composed of laminated wood or otherwise, secured to the container by screws, 12. Upon said keeper we place a rubber sheet, 14, having circular openings, 15, cut therein, according to the number of compartments in the container, the edges of which rubber or similar material project beyond those of the keeper 11, producing a ring-like gasket, as clearly indicated in Fig. 2, and over which gasket material we insert a metal plate, 16, having openings therein registering with those of the gasket and keeper, which plate may be secured by screws, 17, or soldered in place. It will thus be seen, as clearly indicated in Figs. 2 and 3, that a bottle of milk, as 6, is deposited in a compartment surrounded by non-conducting material, and in order to prevent cold or warm air from entering therein and affecting the milk in the bottles, we affix to the lid, 20, of the container so as to project therefrom a requisite number of closures, 21, for each compartment. These closures 21 may be composed of wood or other material, and which we prefer to secure to said lid 20 by a leaf or other spring, 22, so that when bottles are inserted in the compartments, and the lid closed, the closures 21 will readily become seated in the openings or inlets of the compartments, and, by the pressure of the lid, said closures and the gaskets 14 will be fitted tightly together and exclude air from the compartments. The lid 20 is provided with a clasp, 24, preferably of spring material, so that said lid may be readily opened and closed, and in the latter condition such clasp will secure the lid in place, and thus the milk bottles will be securely enclosed from exposure or molestation, for the reasons as hereinbefore indicated; and for convenience in handling we may provide one or more handles, as 25, by which the container may be readily moved from place to place.

We are aware that receptacles for various purposes have been disclosed which embody non-conducting filling material for refrigeration and other purposes, and which we do not broadly claim, but for the preservation and protection of milk as commonly delivered we have demonstrated in practice that a container embodying insulated compartments provided with air-tight closures not only provides a sanitary and safe method of milk delivery but maintains the milk in wholesome condition by preventing the action of climatic conditions thereon. By providing our improved container with a spring clasp, or other readily manipulated device, for securing the lid in place the milkman may quickly open and close the container and thus make the necessary deliveries without undue loss of time, and the use of the container is not only to the advantage of the customers in protecting and preserving the milk, but the dealers are likewise materially benefited by the elimination of loss from climatic conditions, breakage of bottles and other hazards incident to the otherwise careless and uncertain distribution of milk as commonly practiced, and, as indicated, we have demonstrated in the practical use of our improved container that bottled milk delivered at midnight or early morning is preserved in fresh and wholesome condition and the bottles are protected from the breakage and milk from the wastage which now commonly exists.

We claim as our invention:

In a milk bottle container, a body portion, a compartment therein, insulating material surrounding said compartment, a keeper for retaining said insulating material in said body, a gasket over the upper end of said compartment, means for securing said gasket in position, a lid for said container, and a yieldingly mounted closure carried by said lid and adapted to engage said gasket for excluding air from said compartment.

In testimony whereof we affix our signatures.

JOHN M. ROOD.
WILLIAM DRIVER.